US012762840B1

(12) United States Patent
Khan et al.

(10) Patent No.: US 12,762,840 B1
(45) Date of Patent: Oct. 13, 2026

(54) AERIAL IMAGE CLASSIFICATION SYSTEM

(71) Applicant: PRINCE MOHAMMAD BIN FAHD UNIVERSITY, Dhahran (SA)

(72) Inventors: Muhammad Attique Khan, Dhahran (SA); Irum Nahvi, Dhahran (SA)

(73) Assignee: PRINCE MOHAMMAD BIN FAHD UNIVERSITY, Dhahran (SA)

( * ) Notice: Subject to any disclaimer, the term of this patent is extended or adjusted under 35 U.S.C. 154(b) by 0 days.

(21) Appl. No.: 19/575,477

(22) Filed: Mar. 23, 2026

(51) Int. Cl.
*G06V 10/764* (2022.01)
*G06V 10/52* (2022.01)
*G06V 10/82* (2022.01)
*G06V 20/17* (2022.01)

(52) U.S. Cl.
CPC ............ *G06V 10/764* (2022.01); *G06V 10/52* (2022.01); *G06V 10/82* (2022.01); *G06V 20/17* (2022.01)

(58) Field of Classification Search
CPC ...... G06V 10/764; G06V 10/52; G06V 10/82; G06V 20/17
USPC .......................................................... 382/156
See application file for complete search history.

(56) References Cited

U.S. PATENT DOCUMENTS 12,260,179 B2 * 3/2025 Yuan .................... G06V 20/188
2023/0252761 A1 * 8/2023 Du ........................... G01J 3/28
382/224

FOREIGN PATENT DOCUMENTS

CN 114821357 A 7/2022

OTHER PUBLICATIONS

J. Xie, F. Yu and H. Wang, "Stacked Mixture-of-Expert Networks for Fast Aerial Scene Classification," 2022 3rd International Conference on Geology, Mapping and Remote Sensing (ICGMRS), Zhoushan, China, 2022, pp. 121-126 (Year: 2022).*

V. Slyusar and N. Bihun, "Integrating Mixture of Experts into Transformers Architecture to Control UAV Swarms," 2024 14th International Conference on Dependable Systems, Services and Technologies (DESSERT), Athens, Greece, 2024, pp. 1-6 (Year: 2024).*

Qingsong Xu, et al., "Attention-Based Pyramid Network for Segmentation and Classification of High-Resolution and Hyperspectral Remote Sensing Images", Remote Sensing 2020, vol. 12, Issue 12, 3501, Oct. 24, 2020, 34 pages.

(Continued)

*Primary Examiner* — Jennifer Mehmood
*Assistant Examiner* — Dustin Bilodeau
(74) *Attorney, Agent, or Firm* — Oblon, McClelland, Maier & Neustadt, L.L.P.

(57) ABSTRACT

An aerial image classification system includes an unmanned aerial vehicle (UAV), a camera, a memory and a local processor. The UAV is wirelessly connected to a central server unit having a central processor that processes images obtained from the camera of the UAV to generate adaptively scaled spatial representations, applies a Mixture-of-Experts (MoE) architecture to the adaptively scaled spatial representations, assigns weights to expert blocks of the MoE, processes adaptively scaled spatial representations based on the weights of the plurality of expert blocks, combines outputs of the expert blocks to generate an aggregated feature representation; and classifies the input image based on the aggregated feature representation.

9 Claims, 11 Drawing Sheets

(56) References Cited

OTHER PUBLICATIONS

Yichu Xu, et al., "MambaMoE: Mixture-of-spectral-spatial-experts state space model for hyperspectral image classification", Information Fusion, vol. 127, Part B, Oct. 16, 2025, 103811, Excerpts only (7 pages), and arXiv:2504.20509v2 [cs.CV], Oct. 6, 2025 (13 pages).
Yimei Liu, et al., "MixtureRS: A Mixture of Expert Network Based Remote Sensing Land Classification", Remote Sensing 2025, vol. 17, Issue 14, 2494, Jul. 17, 2025, 21 pages.

* cited by examiner

214

218

220

AERIAL IMAGE CLASSIFICATION SYSTEM

STATEMENT OF PRIOR DISCLOSURE BY AN INVENTOR

Aspects of the present disclosure are described in M. J. Abbas et al., "LiteDenseMoE: An Explainable Lightweight Densely Connected Mixture-of-Experts Network for Aerial Scene Recognition in Low Contrast Remote Sensing Images," *IEEE Journal of Selected Topics in Applied Earth Observations and Remote Sensing*, (2025), which is incorporated herein by reference in its entirety.

BACKGROUND

Technical Field

The present disclosure relates to an aerial image classification system, particularly a system installed on a UAV and capable of processing and interpreting images on a central server. The system captures aerial images and may store images on a local memory wirelessly connected to a central server for analysis and interpretation.

Description of Related Art

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Aerial images are widely used for analysis in planning over geographic areas is used for environmental monitoring, military planning, urban planning, disaster management, agriculture, and resource management. Aerial images provide an overhead perspective of a geographic area and are typically obtained at a height of at least 200 feet and may be taken at height from high within the Earth's atmosphere and/or from satellites in low earth and/or geostationary orbits. Recently the use of UAVs has become favored for obtaining aerial images. UAVs have numerous operational capabilities, including the ability to hover or loiter over a geographic area to record aerial images over a period of time. UAVs may be used to provide accurate perspectives of a geographic area from a fixed latitude, longitude and altitude. UAV aerial imaging systems also provide the option for remote operation, unguided operation and/or operation by embedded logic (e.g., AI). A UAV (drone) may be dispatched to a geographic area to automatically obtain aerial images without intervention of a human.

Due to the ease of acquiring aerial images, significant amounts of data in the form of, for example, digitized images, can quickly be obtained and stored. One challenge is to maximize data acquisition without overloading or taxing the memory and data storage capabilities of a UAV device being used to acquire images. Memory and processor features can be installed on the UAV device, nonetheless significant amounts of data in the form of digital image or video files can quickly overwhelm on board capability. This becomes further complex when additional data relating to features such as temperatures, temperature gradients, air quality and weather conditions are matched with each image. Furthermore, complicating factors imposed by the environment, such as fog, sandstorms and other atmospheric interference, may lead to the collection of ever larger amounts of data to provide a final output of suitable clarity and recognition.

Conventionally, analysis and classification of aerial images has utilized deep learning and machine learning techniques. Convolutional neural networks (CNN) and/or transformer-based architectures have been applied to aerial image data for the purpose of classification and interpretation. Although such conventional techniques have provided some improvements, complexities of environment, mission goals, resolution limitations, and the like require additional improvements for acquiring, interpreting, classifying and managing large amounts of data in a secure fashion.

Aerial image classification and processing is even further complicated when taking into account, image overlap, pattern repetition, aspect, and the lighting conditions. Image overlap implies redundancy, resulting in lost data efficiency and a corresponding loss and reduction in on-board data storage capabilities.

Accordingly, there exists a need for a system capable of aerial image acquisition, classification and/or processing especially for remote sensing applications away from a base station. The aerial image system provided in the present disclosure is capable of dynamically adapting to spatial scales and context with the environment (geography) or content of image. The image system maintains computational efficiency and provides for adaptive feature representation, selective processing of image regions, and robust handling of data (images) having heterogeneous characteristics. The system may be implemented for a variety of application relying on aerial images including environmental monitoring, urban development, law enforcement, military planning and resource management.

SUMMARY

In an exemplary embodiment an aerial image classification system is provided. The system comprises an unmanned aerial vehicle (UAV) with a camera, a memory and a local processor, and a central server unit. The server has a processor that functions to process an aerial image (e.g., an input remote sensing image) to generate one or more adaptively scaled spatial representations. A Mixture-of-Experts (MoE) architecture comprising a plurality of expert blocks and a routing mechanism is applied to the adaptively scaled spatial representations. Weights are assigned to the expert blocks based on respective capabilities and features of the plurality of expert blocks. Each expert block processes portions of the adaptively scaled spatial representations based on the weights assigned to each of the expert blocks. Combining the outputs of the expert blocks generates an aggregated feature representation which is classifies as the aerial image based on the aggregated feature representation.

In an exemplary embodiment, the system includes processor capability to process the aerial image by using an Adaptive Scale-Space Pyramid Network (ASSPN) to generate the adaptively scaled spatial representations, wherein the ASSPN is configured to integrate a low-level spatial data with a high-level semantic data and employ a self-attention mechanism to dynamically select one or more optimal feature resolution for respective regions of the input remote sensing image.

In an exemplary embodiment, the system generates the adaptively scaled spatial representations based on feature entropy and contextual variance.

In an exemplary embodiment, the expert blocks comprise a plurality of linear layers, a dropout layer with a 0.5 dropout factor, and a rectified linear unit (ReLU) activation function.

In an exemplary embodiment, the routing mechanism comprises a primary linear layer, a first ReLU activation layer, a secondary linear layer, and a SoftMax activation layer.

In an exemplary embodiment, the processor processes the one or more features through a first dense block, a second dense block, and a third dense block.

In an exemplary embodiment, the processor to applies a first transition layer block after the first dense block, using a first transition layer block that includes a batch normalization layer, a convolutional layer configured to reduce one or more channels, and an average pooling layer configured to reduce spatial dimensions.

In an exemplary embodiment, the first dense block, the second dense block, and the third dense block comprises a plurality of dense layers.

In an exemplary embodiment, the local or central processor applies a second transition layer block after the second dense block.

In another exemplary embodiment, the foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
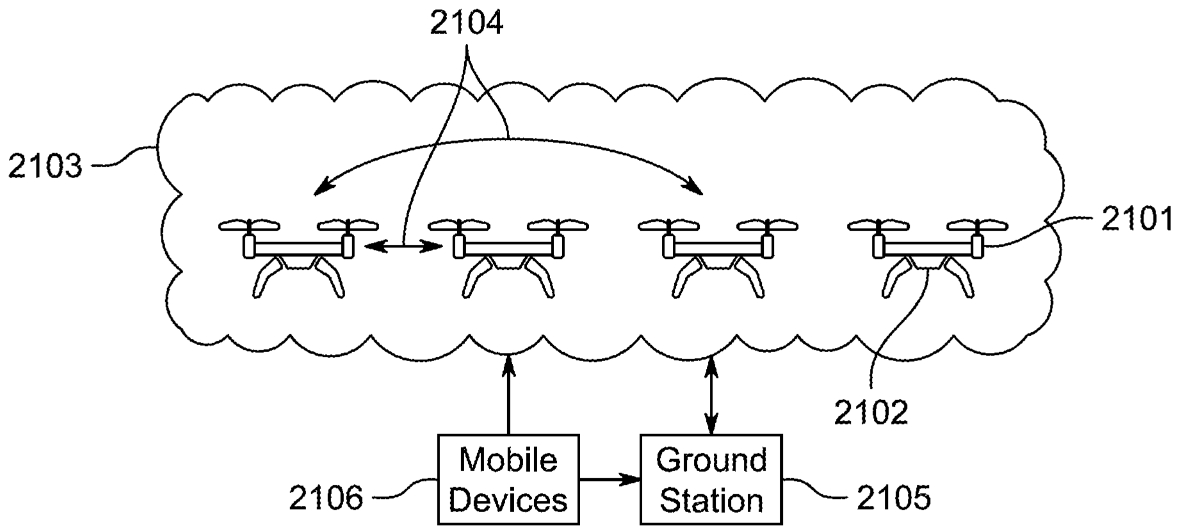
FIG. 1 is a schematic showing an exemplary system for implementing the aerial image classification system, according to an embodiment of the present invention.

In the drawings, like reference numerals designate identical or corresponding parts throughout the several views. Further, as used herein, the words “a”, “an” and the like generally carry a meaning of “one or more”, unless stated otherwise.

Furthermore, the terms “approximately,” “approximate”, “about” and similar terms generally refer to ranges that include the identified value within a margin of 20%, 10%, or preferably 5%, and any values therebetween.

The present disclosure addresses several technical challenges associated with conventional remote sensing scene classification techniques. A first challenge arises from the reliance of many existing deep learning models, including Convolutional Neural Networks (CNNs) and transformer-based architectures, on fixed-scale feature representations, which can limit their ability to accurately capture spatial details and semantic context in remote sensing imagery characterized by significant scale variations. A second challenge relates to the difficulty of effectively integrating low-level spatial information with high-level semantic information in a manner that is adaptive to region-specific characteristics of an input image. A further challenge is the increased computational complexity and reduced generalization performance often observed when applying deep learning models to heterogeneous aerial datasets exhibiting diverse viewpoints, environmental conditions, and scene compositions.

The camera for the UAV is preferably a color system that may be commercially available. He camera may include a gimbaled pan/zoom/tilt (PZT) apparatus to provide directionality to the camera when acquiring images. The field of view (FOV) of camera is preferably 120 degrees or more. The camera may acquire a plurality of images that are stitched together to form a seamless single full field view image. Preferably the camera is a sensor array type camera having two or more sensors to provide a large field of view and optionally different image/illumination types. A sensor array camera has a number of image sensors that may be synchronized to capture images simultaneously. A processor (e.g., local processor) processes these images to simulate a single camera with stitched images. Sensors may include digital image sensors such as CMOS image sensors that provide a digital (RGB) output representing raw pixel data for an image frame. Each camera preferably includes a lens holder and lens.

The methods and systems of the present disclosure overcome the above-mentioned challenges by providing a remote sensing image classification architecture that combines an Adaptive Scale-Space Pyramid Network (ASSPN) with a Lightweight Dense Mixture of Experts (LiteDense-Mixture of Experts (LiteDenseMoE)) framework. The ASSPN introduces a novel multi-scale feature fusion mechanism that dynamically integrates low-level spatial details with high-level semantic information, and adaptively scales spatial representations based on feature entropy and contextual variance. In an embodiment, a self-attention mechanism is employed to select optimal feature resolutions for respective regions of an input remote sensing image, enabling region-specific adaptation rather than fixed or globally applied scaling.

In conjunction with the ASSPN, the disclosed LiteDenseMoE model incorporates a DenseNet-inspired feature extraction backbone, channel attention and spatial attention modules, and a Mixture-of-Experts (MoE) architecture. The DenseNet structure facilitates efficient hierarchical feature reuse, while the attention modules emphasize informative channels and spatial regions and suppress less relevant features. The MoE architecture includes multiple expert blocks and a routing mechanism configured to assign adaptive weights to the expert blocks based on learned feature characteristics, thereby enabling specialized processing of diverse input scenes with reduced computational overhead.

One objective of the present disclosure is to provide a remote sensing scene classification solution that achieves high accuracy and robustness in the presence of scale variations, viewpoint differences, and environmental distortions commonly encountered in aerial and coastal imagery. Another objective is to reduce computational cost through lightweight architectural design, including dynamic channel pruning and attention-guided scaling, while maintaining strong generalization performance across heterogeneous datasets. A further objective is to support practical deployment in applications including land-use mapping, urban planning, and environmental monitoring by enabling efficient and interpretable multi-scale feature learning.

Accordingly, the present disclosure provides a practical, adaptive, and computationally efficient deep learning framework for remote sensing image classification that enhances classification precision, robustness, and scalability across diverse operational scenarios.

Aspects of the aerial image classification system are described in FIG. 1 including one or more UAVs (2101). Each UAV includes memory and a local processing unit (2102). The plurality of UAVs, through communication channels (2104) provides a network UAV (edge) devices (2103). The UAVs communicates with a ground station and/or central server (2105) and/or mobile devices (2106) which may communicate directly with the UAVs or through the ground station (2105).

Figure 2:
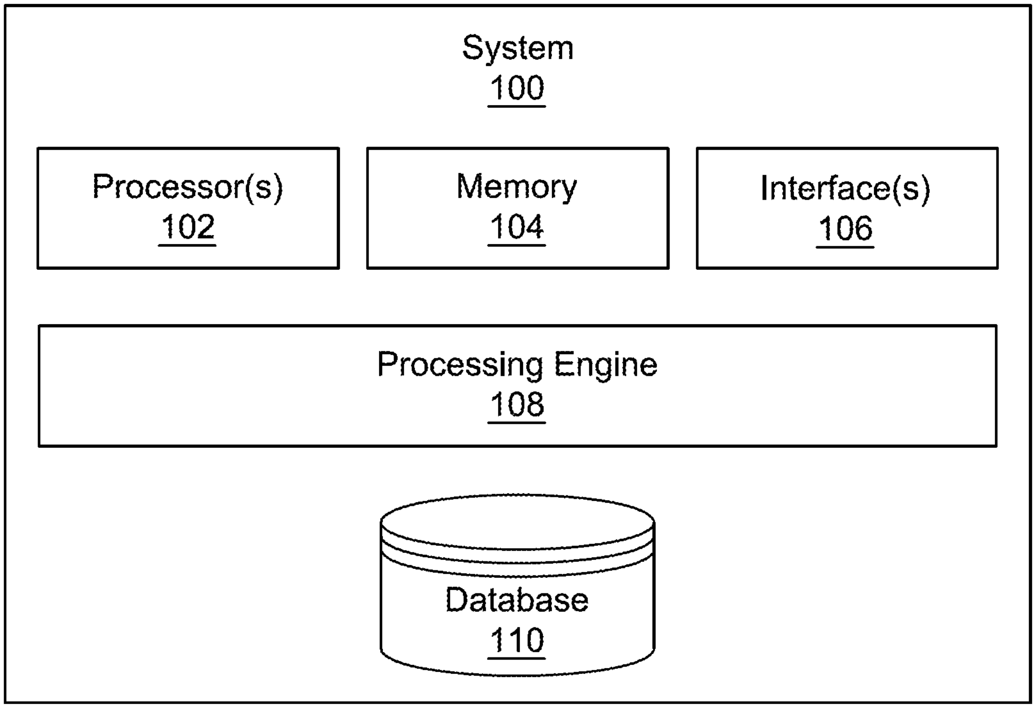
FIG. 2 is a schematic block diagram showing an exemplary system for implementing remote sensing scene classification, according to an embodiment of the present invention.

FIG. 2 illustrates an exemplary block diagram of the system 100 for remote sensing scene classification, in accordance with an embodiment of the present disclosure.

In an embodiment, the system 100 may include one or more processor(s) 102, e.g., local processor or central processor. The one or more processor(s) 102 may be implemented as one or more microprocessors, microcomputers, microcontrollers, digital signal processors, central processing units, logic circuitries, and/or any devices that process data based on operational instructions. Among other capabilities, the one or more processor(s) 102 may be configured to fetch and execute computer-readable instructions stored in a memory 104 of the system 100. The memory 104 may be configured to store one or more computer-readable instructions or routines in a non-transitory computer readable storage medium, which may be fetched and executed to create or share data packets over a network service. The memory 104 may include any non-transitory storage device including, for example, volatile memory such as a Random-Access Memory (RAM), or a non-volatile memory such as an Erasable Programmable Read Only Memory (EPROM), a flash memory, and the like.

In an embodiment, the system 100 may include a processing engine 108 that may be implemented as a combination of hardware and programming (for example, programmable instructions) to implement one or more functionalities of the processing engine 108. In examples described herein, such combinations of hardware and programming may be implemented in several different ways. For example, the programming for the processing engine 108 may be processor-executable instructions stored on a non-transitory machine-readable storage medium, and the hardware for the processing engine 108 may comprise a processing resource (for example, one or more processors) to execute such instructions. In the present examples, the machine-readable storage medium may store instructions that, when executed by the processing resource, implement the processing engine 108. In such examples, the system 100 may comprise the machine-readable storage medium storing the instructions and the processing resource to execute the instructions, or the machine-readable storage medium may be separate but accessible to the system 100 and the processing resource. In other examples, the processing engine 108 may be implemented by electronic circuitry.

In an embodiment, the processor 102 is operatively coupled to one or more non-transitory computer-readable storage media storing instructions that, when executed by the processor 102, cause the processor 102 to perform remote sensing scene classification operations as described herein.

The interface(s) 106 represents communication modules and input/output ports that enable the system 100 to receive remote sensing images, transmit classification results, and interact with external devices or networks, supporting wired or wireless protocols suitable for satellite or UAV data exchange.

In operation, the processor 102 is configured to process an input remote sensing image using an Adaptive Scale-Space Pyramid Network (ASSPN) to generate one or more adaptively scaled spatial representations. The ASSPN is configured to integrate low-level spatial data and high-level semantic data extracted from the input remote sensing image. In an embodiment, the ASSPN may use attention-based weighting to select feature resolutions appropriate for different spatial regions of the input image. Further, the one or more adaptively scaled spatial representations may improve robustness to object size variation and scene complexity. In an embodiment, the ASSPN employs a self-attention mechanism to dynamically select one or more optimal feature resolutions for respective regions of the input remote sensing image.

In one implementation, the one or more adaptively scaled spatial representations are generated based on feature entropy and contextual variance associated with the extracted features.

The processor 102 is further configured to apply a Mixture-of-Experts (MoE) architecture to the one or more adaptively scaled spatial representations. The MoE architecture comprises a plurality of expert blocks and a routing mechanism.

The routing mechanism is configured to assign one or more weights to the plurality of expert blocks based on respective capabilities and features of the plurality of expert blocks. Each expert block is configured to process one or more portions of the adaptively scaled spatial representations in accordance with the assigned weights.

In an embodiment, each expert block comprises a plurality of linear layers, a dropout layer having a dropout factor of 0.5, and a rectified linear unit (ReLU) activation function. In an embodiment, the routing mechanism comprises a primary linear layer, a first ReLU activation layer, a secondary linear layer, and a SoftMax activation layer.

Outputs of the plurality of expert blocks are combined to generate an aggregated feature representation.

The processor 102 is further configured to classify the input remote sensing image based on the aggregated feature representation to generate a scene classification result.

In an embodiment, the processor 102 is configured to process extracted features through a first dense block, a second dense block, and a third dense block. Each of the first dense block, the second dense block, and the third dense block comprises a plurality of dense layers.

A first transition layer block is applied after the first dense block. The first transition layer block comprises a batch normalization layer, a convolutional layer configured to reduce one or more channels, and an average pooling layer configured to reduce spatial dimensions.

A second transition layer block is applied after the second dense block.

In an embodiment, the processor 102 is configured to apply a multi-level feature fusion mechanism across a plurality of encoder branches and a plurality of decoder branches of a neural network architecture. In one implementation, the multi-level feature fusion mechanism uses one or more learned weighting functions to combine features across different levels of the neural network.

The database 110, maintains datasets, trained model weights, auxiliary classifier parameters, and historical classification results, interfacing with the processing engine 108 to provide necessary data for training, validation, and inference. Functionally, the components within system 100 operate in concert to perform remote sensing scene classification by processing input images received via the interface(s) 106 through the processor(s) 102 under the control of the processing engine 108, which executes the ASSPN to extract adaptive multi-scale features.

Figure 3:
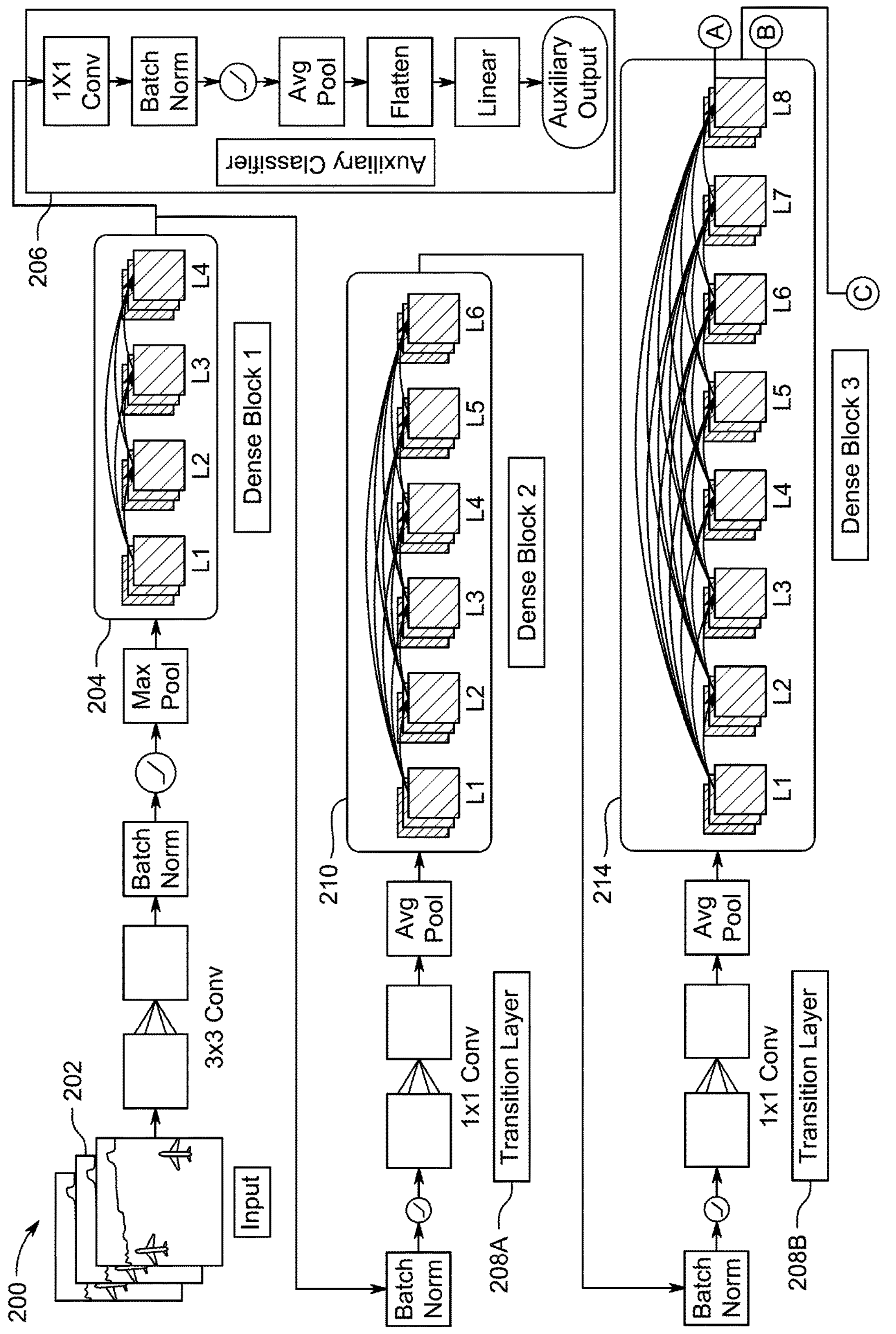
FIG. 3 is a schematic diagram illustrating the neural network architecture of the remote sensing scene classification system, depicting the flow of data through input layers, dense blocks, attention modules, and the Mixture-of-Experts architecture, according to an embodiment of the present invention.
Figure 3:
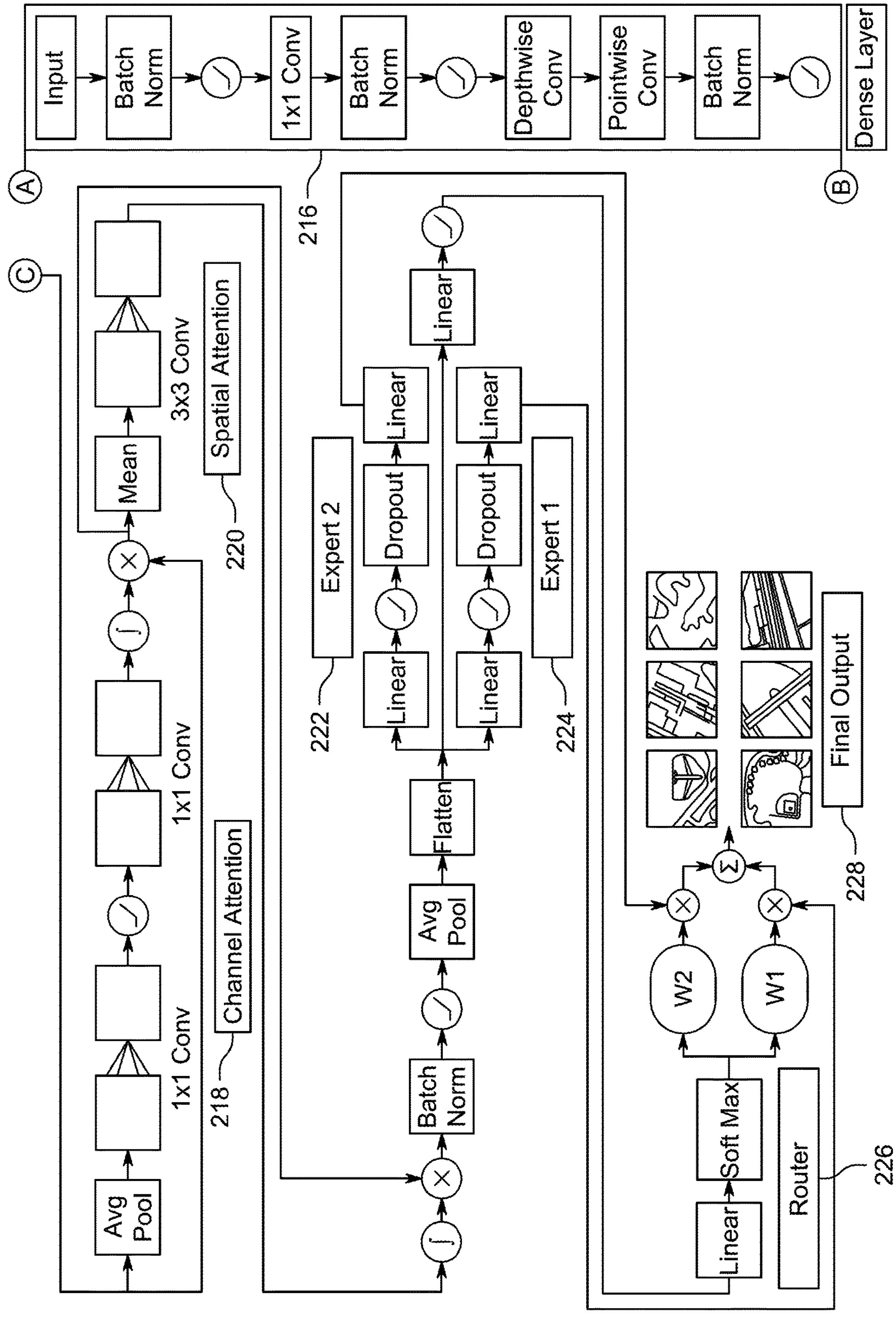

FIG. 3 refers to a schematic diagram of the system 200 illustrating the integrated neural network architecture combining the Adaptive Scale-Space Pyramid Network (ASSPN) with the Mixture-of-Experts (MoE) architecture. The system 200 begins with an input layer configured to accept remote sensing images or one or more input images 202. In an embodiment, the input image has dimensions of 224×224×3. The input image is provided to one or more initial convolutional layers configured to perform early-stage feature extraction.

The input image 202 is processed by an initial convolutional stage comprising a 7×7 convolutional layer with a stride of 2×2 and padding of 3×3, followed by a batch normalization layer, a rectified linear unit (ReLU) activation function, and a max pooling layer having a pool size of 3×3.

The output of the initial processing stage is defined mathematically as:

$$Z = M_{\mathcal{P}}(\sigma(\beta(W * X + b))) \tag{1}$$

where ×denotes the input image 202, W represents convolutional weights, b is a bias term, β denotes batch normalization, a denotes the ReLU activation function, * represents convolution, and M_{\mathcal{P}} denotes max pooling.

The output Z is forwarded to a first dense block 204, comprising a plurality of dense layers L1-L4. Each dense layer includes a batch normalization layer, a ReLU activation function, a 1×1 convolution, followed by a depthwise separable 3×3 convolution, a pointwise convolution, and a subsequent batch normalization and ReLU activation.

The processing within a dense layer is represented as:

$$y = \beta(\sigma(W_{1\times1} * Z + b_1)) \tag{2}$$

$$y' = Conv_{DW}(\sigma(\beta(y))) \tag{3}$$

where Conv_{DW} denotes the depthwise separable convolution.

The output of each dense layer is concatenated with outputs of preceding layers, defined as:

$$Y_L = [y', Y_{L-1}, \ldots, Y_0] \tag{4}$$

An auxiliary classifier 206 is connected to the output of the first dense block 204. The auxiliary classifier 206 comprises a 1×1 convolutional layer, batch normalization, ReLU activation, an average pooling layer, a flattening operation, and a linear classification layer to generate an intermediate prediction.

Following the first dense block 204, the features are passed through the first transition layer 208A, comprising batch normalization, a 1×1 convolutional layer for channel reduction, and an average pooling layer for spatial downsampling. This operation is defined as:

$$T_1 = A_\rho(W_{1\times1} * \sigma(\beta(Y))) \tag{5}$$

where $A_\rho$ denotes average pooling layer and $T_1$ denotes the first transition layers 208A block.

The output of the first transition layer 208A is provided to the second dense block 210, comprising dense layers L1-L6.

The output of the second dense block 210 is passed through the second transition layer 208B, followed by the third dense block 214 comprising dense layers L1-L8, configured similarly to the first dense block 204 but with increased depth.

The output of the third dense block 214 is provided to a channel attention module 218. The channel attention module 218 applies average pooling followed by two 1×1 convolutional layers, with ReLU and sigmoid activations, to generate channel-wise attention weights.

The channel attention operation is defined as:

$$A_{ch} = \psi(W_2 * \sigma(W_1 * A_\rho(Y_3))) \tag{6}$$

-continued $$Y_{ch} = Y_3 \otimes A_{ch} \quad (7)$$

where ψ denotes the sigmoid activation function and ⊗ denotes element-wise multiplication.

The output of the channel attention module 218 is forwarded to a spatial attention module 220, which applies a 3×3 convolution followed by a sigmoid activation to generate spatial attention weights:

$$A_s = \psi(W_s * A_p(Y_{ch})) \quad (8)$$

$$Y_s = A_s * Y_{ch} \quad (9)$$

The output $Y_s$ represents spatially emphasized feature maps.

The spatially attended features are flattened and passed to a Mixture-of-Experts (MoE) architecture comprising Expert 1 (222), Expert 2 (224), and a routing mechanism 226.

Each expert block processes features according to:

$$E = L_2(\delta_{0.5}(\sigma(L_1(Y_F)))) \quad (10)$$

where δ_{0.5} denotes dropout with a factor of 0.5.

The routing mechanism assigns weights $R_1$, $R_2$, and the final output is computed as:

$$Y_{final} = (E_1 \times R_1) + (E_2 \times R_2) \quad (11)$$

The combined expert output is provided to a classification layer to generate the final output 228, corresponding to a predicted remote sensing scene class.

The network proceeds through three Dense Blocks: Dense Block 1 204 with four dense layers, Dense Block 2 210 with six dense layers, and Dense Block 3 214 with eight dense layers. Each dense block employs depth-wise separable convolutions, which decompose standard convolutions into depth-wise and point-wise convolutions to reduce parameter count and computational cost, batch normalization, and ReLU activations. The dense connectivity pattern within each block, as detailed in subsequent figures, facilitates feature reuse and multi-level feature extraction. Between the dense blocks, the transition layers 208A, 208B reduce spatial resolution and channel dimensionality via 1×1 convolutions followed by batch normalization and average pooling, compressing feature representations for efficient processing.

In implementation, the system incorporates the following:

The first dense block 204 comprises the plurality of dense layers L1-L4, each configured to receive feature maps from all preceding layers within the block. In an embodiment, each dense layer includes a batch normalization layer, a ReLU activation layer, a 1×1 convolution, followed by a depthwise separable 3×3 convolution, a pointwise convolution, and a subsequent batch normalization and ReLU activation.

The outputs of the dense layers are concatenated and propagated forward within the block. In the illustrated embodiment, an auxiliary classifier 206 is connected to the output of the first dense block 204. The auxiliary classifier 206 comprises a 1×1 convolutional layer, a batch normalization layer, a ReLU activation layer, an average pooling layer, a flattening layer, and a linear classification layer configured to generate an intermediate classification output.

Following the first dense block 204, the feature maps are passed through a first transition layer 208. The first transition layer 208A includes the batch normalization layer, the 1×1 convolutional layer configured to reduce channel dimensionality, and the average pooling layer configured to reduce spatial dimensions.

The output of the first transition layer 208A is provided to the second dense block 210, which comprises the plurality of dense layers L1-L6. The second dense block 210 follows a structure similar to the first dense block but includes a greater number of dense layers to capture more complex feature representations.

The output of the second dense block 210 is forwarded to the second transition layer 208B, which is configured in a manner similar to the first transition layer 208A, including channel reduction and spatial down sampling operations.

Subsequently, the processed features are provided to the third dense block 214, which includes the plurality of dense layers L1-L8. Each dense layer within the third dense block 214 includes a 1×1 convolution, batch normalization, ReLU activation, a depthwise separable 3×3 convolution, a pointwise convolution, and a subsequent batch normalization and ReLU activation. The outputs of the dense layers are concatenated to generate a high-level feature representation.

The output of the third dense block 214 is provided to the channel attention module 218. The channel attention module 218 includes an average pooling operation followed by one or more 1×1 convolutional layers configured to reduce and subsequently restore channel dimensionality. A ReLU activation function is applied between convolutional layers, and a sigmoid activation function generates channel-wise attention weights. The attention weights are applied to the feature maps using element-wise multiplication.

The output of the channel attention module 218 is then passed to the spatial attention module 220. The spatial attention module 220 aggregates channel-wise information and applies the 3×3 convolutional layer, followed by a sigmoid activation function to generate spatial attention weights. The spatial attention weights are applied to emphasize spatially significant regions of the feature maps.

Following the attention modules 218, 220, the features are passed through the batch normalization layer, the ReLU activation layer, the average pooling layer, and the flattening operation to generate the flattened feature vector.

The outputs of the expert blocks 222, 224 are multiplied by their respective routing weights and combined to generate a final feature representation.

The combined expert output is provided to a classification layer to generate the final output 228, which represents the predicted remote sensing scene class. In an embodiment, the SoftMax activation function is applied to generate class probability scores, and the class associated with the highest probability is selected as the final classification result.

Figure 4:
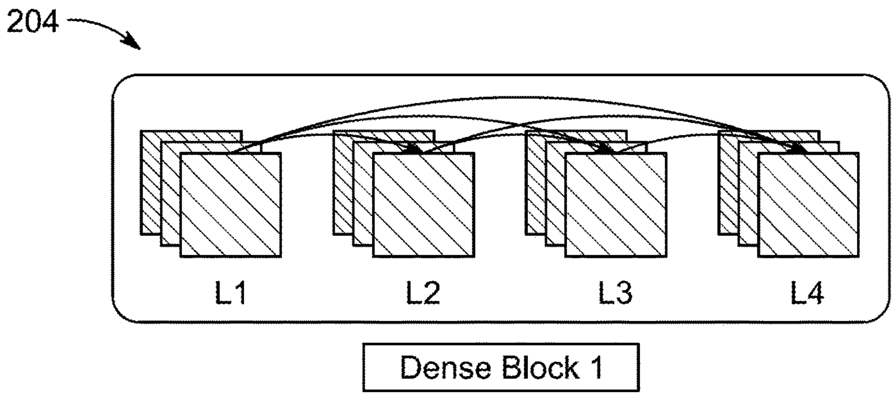
FIG. 4 is a schematic representation of the internal architecture of Dense Block 1, according to an embodiment of the present invention.

FIG. 4 depicts the internal architecture of the Dense Block 1. The Dense Block 1 comprises four sequential dense layers, L1 through L4, each represented as stacks of multichannel feature maps. The hallmark dense connectivity pattern is illustrated by arrows extending from each dense layer to all subsequent layers, indicating that the output feature maps of each layer are concatenated with those of all preceding layers and serve as input to succeeding layers. This concatenation along the channel dimension preserves spatial resolution and enables direct feature reuse, mitigating vanishing gradient problems and enriching feature diversity.

Each dense layer employs depth-wise separable convolutions, batch normalization, and ReLU activations to progressively refine and enrich input feature representations, capturing both low-level spatial details and high-level semantic information essential for adaptive multi-scale learning in remote sensing imagery.

Figure 5:
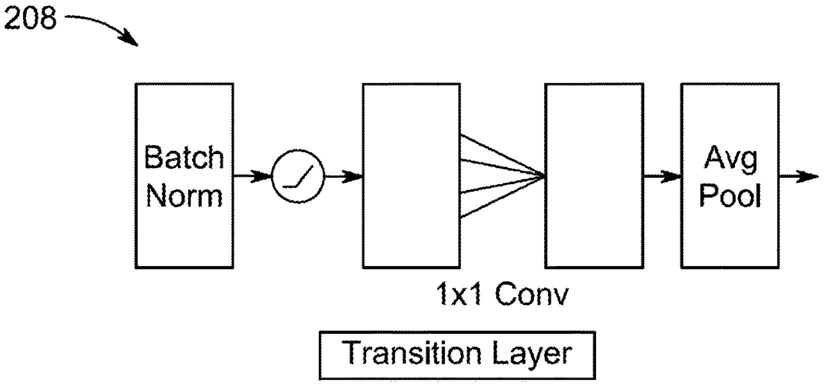
FIG. 5 is a schematic diagram of a Transition Layer, according to an embodiment of the present invention.

FIG. 5 illustrates an embodiment of the transition layer 208A, 208B within the Adaptive Scale-Space Pyramid Network (ASSPN). The transition layer 208A, 208B functions as an intermediate processing stage configured to reduce spatial dimensions and channel depth of feature maps received from a preceding dense block.

In an embodiment, the transition layer 208A, 208B comprises a batch normalization layer, a rectified linear unit (ReLU) activation function, a 1×1 convolutional layer, and an average pooling layer, arranged sequentially. The batch normalization layer normalizes the input feature maps to improve numerical stability during training. The ReLU activation function introduces non-linearity into the feature representations. The 1×1 convolutional layer performs channel-wise linear combinations to reduce the number of feature channels while maintaining spatial resolution. The average pooling layer reduces the spatial dimensions of the feature maps by computing average values over predefined pooling regions.

This sequence of operations produces a compressed feature representation suitable for subsequent processing by downstream dense blocks.

Figure 6:
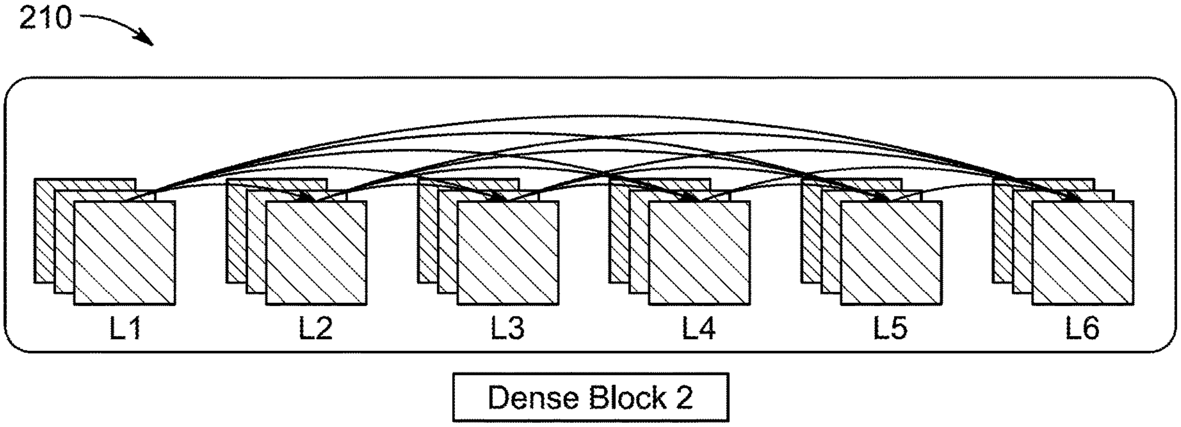
FIG. 6 is a schematic representation of Dense Block 2, according to an embodiment of the present invention.

FIG. 6 illustrates an embodiment of the second dense block 210 within the Adaptive Scale-Space Pyramid Network (ASSPN). The dense block 210 includes a plurality of six dense layers L1-L6 arranged in a densely connected configuration.

In an embodiment, each dense layer within the dense block 210 receives, as input, a concatenation of feature maps produced by all preceding dense layers within the same block. This connectivity pattern is represented by connections extending from each dense layer to all subsequent dense layers. Each dense layer comprises a depth-wise separable convolutional layer, a batch normalization layer, and a rectified linear unit (ReLU) activation function.

The dense block 210 is positioned downstream of a first transition layer and upstream of the third dense block. Through successive dense layers, the dense block 210 progressively refines feature representations by combining spatial and semantic information derived from earlier network stages. In some embodiments, each dense layer within the dense block 210 receives feature maps from preceding layers to promote feature reuse and gradient flow.

Figure 7:
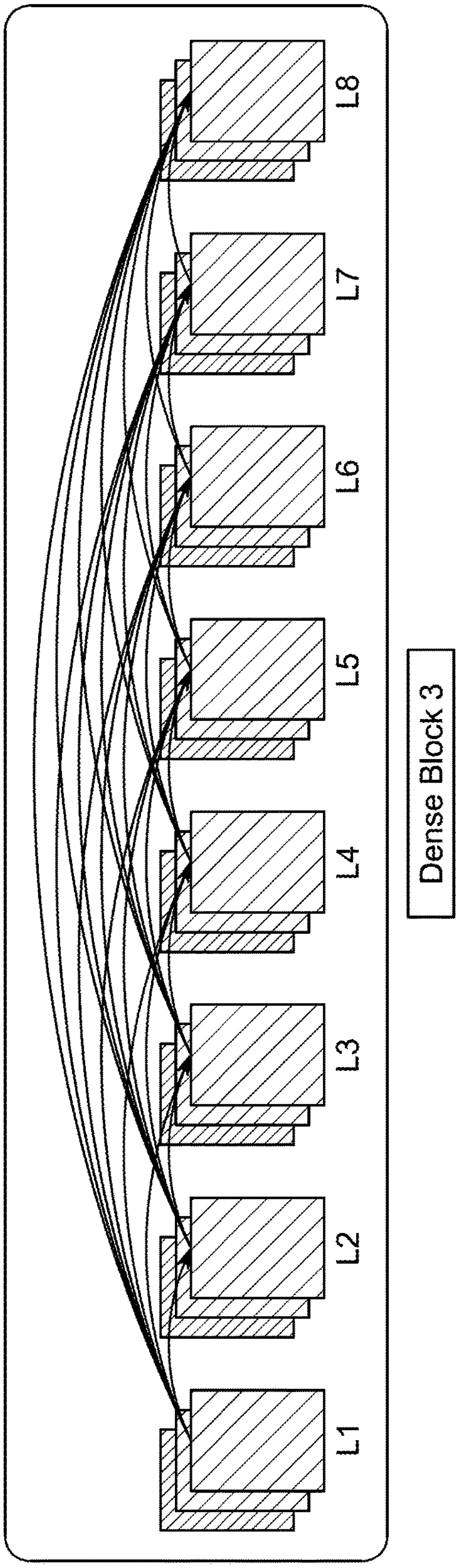
FIG. 7 is a schematic representation of Dense Block 3, according to an embodiment of the present invention.

FIG. 7 illustrates an embodiment of the third dense block 214 within the Adaptive Scale-Space Pyramid Network (ASSPN). The dense block 214 comprises the plurality of eight dense layers L1-L8 arranged in a densely connected configuration.

In an embodiment, each dense layer within the dense block 214 performs a sequence of operations including a depth-wise separable convolution, a batch normalization operation, and a rectified linear unit (ReLU) activation function. Outputs of each dense layer are concatenated along a channel dimension with outputs of preceding dense layers and provided as input to subsequent dense layers.

The dense block 214 is configured to generate a composite feature representation by enabling access to features produced at multiple depths of the block. The output of the dense block 214 is provided to one or more attention modules, enabling subsequent enhancement of feature representations.

Figure 8:
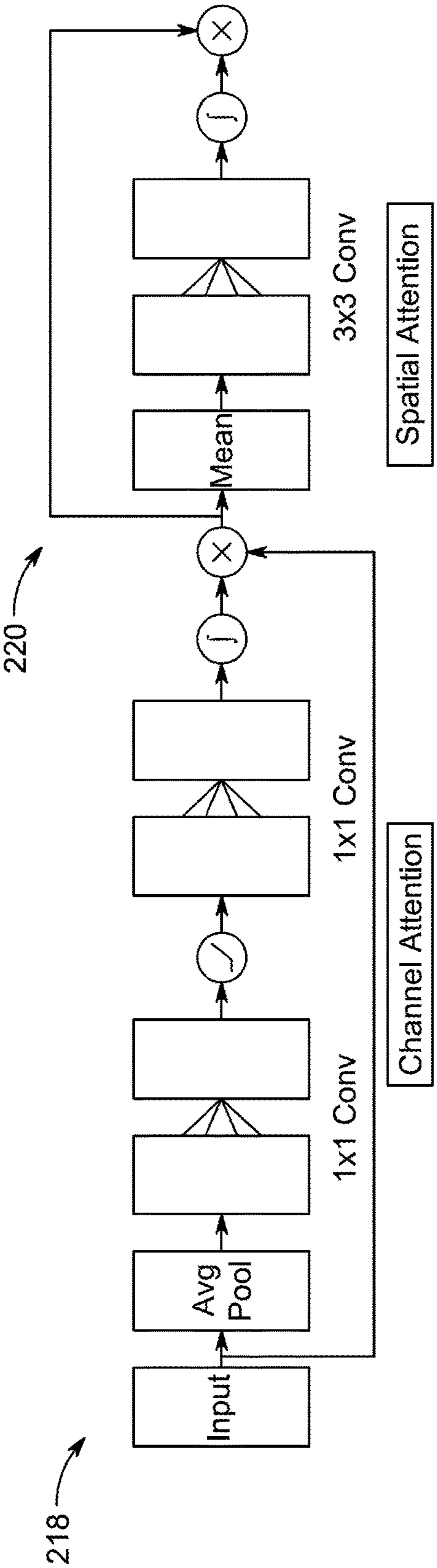
FIG. 8 is a detailed schematic diagram of the attention modules, illustrating the channel attention and spatial attention mechanisms applied to feature maps, according to an embodiment of the present invention.

FIG. 8 details the attention modules incorporated within the ASSPN, comprising channel attention and spatial attention mechanisms that enhance feature representation by selectively emphasizing salient channels and spatial regions. The input feature map, denoted as $Y_3$, is the output of the Dense Block 3. The channel attention module first applies average pooling across spatial dimensions to produce a channel descriptor vector capturing global contextual information. This vector is processed through two sequential 1×1 convolutional layers with intermediate nonlinear activation (e.g., ReLU), followed by a sigmoid activation function 7P to generate channel attention weights $A_{ch}$. These weights are broadcasted and multiplied element-wise with the input feature map $Y_3$ to produce the channel-attended feature map $Y_{ch}$:

$$A_{ch} = \psi(W_2 * \sigma(W_1 * A_\rho(Y_3)))$$

$$Y_{ch} = Y_3 \odot A_{ch}$$

where $A_\rho$ denotes average pooling, $W_1$ and $W_2$ are convolutional weights, $\sigma$ is the ReLU activation, and $\odot$ denotes element-wise multiplication.

Subsequently, the spatial attention module computes the mean across the channel dimension of $Y_{ch}$ to obtain a spatial descriptor, which is processed by a 3×3 convolutional layer followed by a sigmoid activation to generate spatial attention weights $A_s$. These weights are multiplied element-wise with $Y_{ch}$ to yield the final attention-enhanced feature map $Y_s$:

$$A_s = \psi(W_s * A_\rho(Y_{ch}))$$

$$Y_s = A_s \odot Y_{ch}$$

Here, $W_s$ represents the convolutional weights of the spatial attention layer. The combined channel and spatial attention mechanisms recalibrate feature responses, improving the network's focus on informative features relevant for remote sensing scene classification, particularly under challenging low-contrast and noisy conditions.

Figure 9:
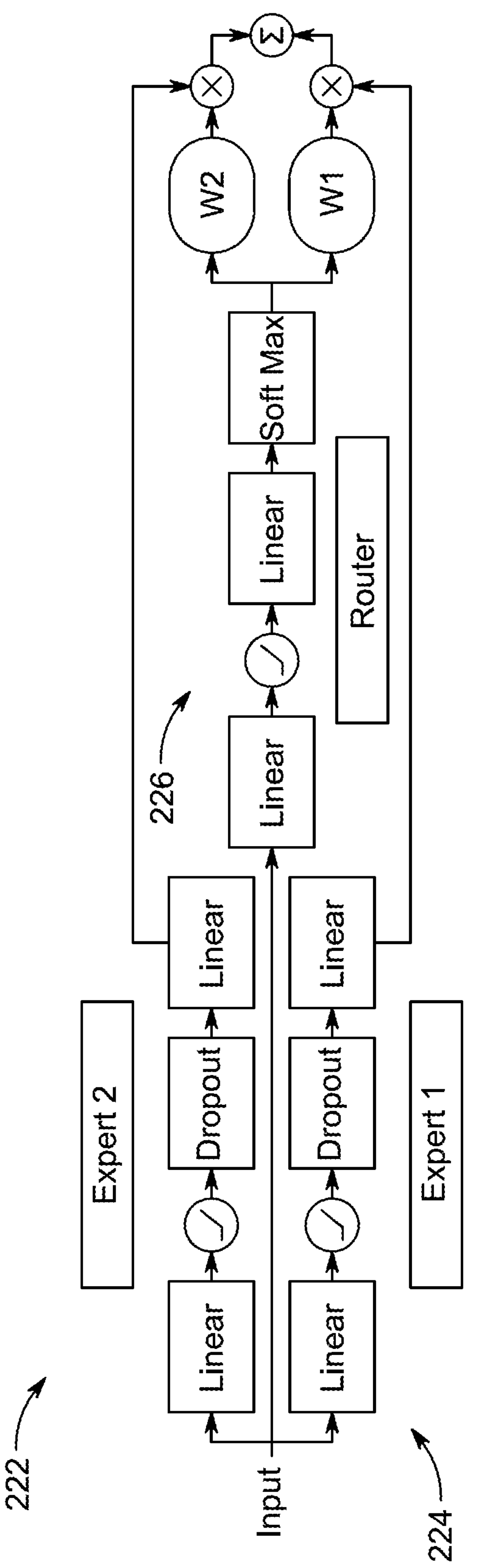
FIG. 9 is a schematic block diagram of the Mixture-of-Experts architecture, showing two expert blocks and a routing network that dynamically weights and aggregates expert outputs, according to an embodiment of the present invention.

FIG. 9 illustrates the Mixture-of-Experts (MoE) architecture integrated within the classification system. The MoE comprises two expert blocks, the Expert 1 224 and Expert 2 222, each independently processing the same input feature vector $Y_F$, which is the flattened output of the attention-enhanced features from the ASSPN. Each expert block includes two linear layers $L_1$ and $L_2$, a dropout layer 5 with dropout factor 0.5 to reduce overfitting by randomly deactivating neurons during training, and ReLU activation $\sigma$:

$$E = \mathcal{L}_2(\delta_{0.5}(\sigma(\mathcal{L}_1(Y_F))))$$

The outputs of Expert 1 224 and Expert 2 222, denoted $E_1$ and $E_2$ respectively, are weighted by routing weights $R_1$ and $R_2$ generated by a routing network. The routing network receives the same input feature vector $Y_F$ and comprises a linear layer, ReLU activation, another linear layer, and a SoftMax activation function to produce normalized weights:

$$(R_1, R_2) = SoftMax(\mathcal{L}_2(\sigma(\mathcal{L}_1(Y_F))))$$

The weighted expert outputs are aggregated via summation to form the final feature representation $Y_{final}$:

$$Y_{final} = (E_1 \times R_1) + (E_2 \times R_2)$$

This aggregated output is then passed through a SoftMax classification layer to produce class probabilities for scene classification. The MoE architecture enables expert specialization and dynamic weighting, improving the model's adaptability and robustness in handling heterogeneous and complex remote sensing data.

Figure 10:
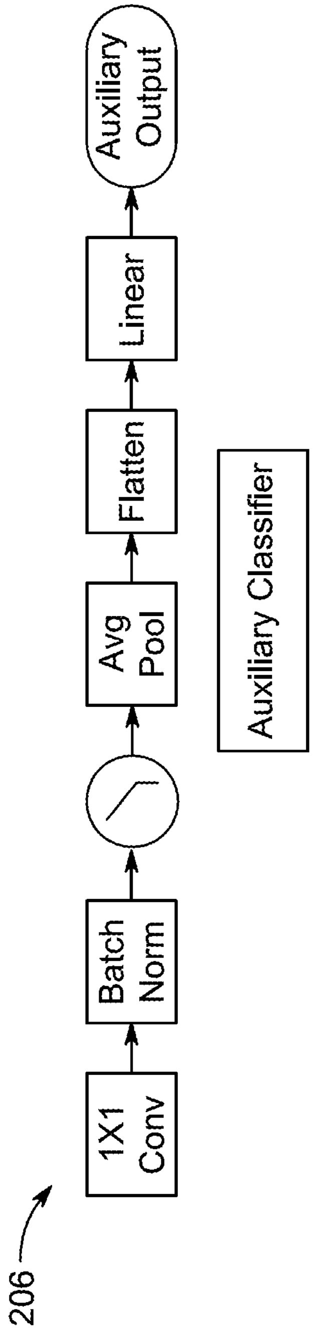
FIG. 10 is a schematic flow diagram of the Auxiliary Classifier, depicting the sequence of convolution, batch normalization, activation, pooling, flattening, and linear classification layers, according to an embodiment of the present invention.

FIG. 10 depicts the Auxiliary Classifier 206 incorporated within the network architecture to provide intermediate supervision after the Dense Block 1 204. The Auxiliary Classifier 206 comprises a 1×1 convolutional layer that reduces the dimensionality of feature maps output from Dense Block 1 204, followed by batch normalization to stabilize training, ReLU activation to introduce nonlinearity, and average pooling to downsample spatial dimensions. The pooled features are flattened into a one-dimensional vector and passed through a linear layer that maps to output neurons corresponding to classification categories. The auxiliary output provides intermediate classification predictions during training, facilitating gradient flow, mitigating vanishing gradient issues, and improving convergence rates.

Figure 11:
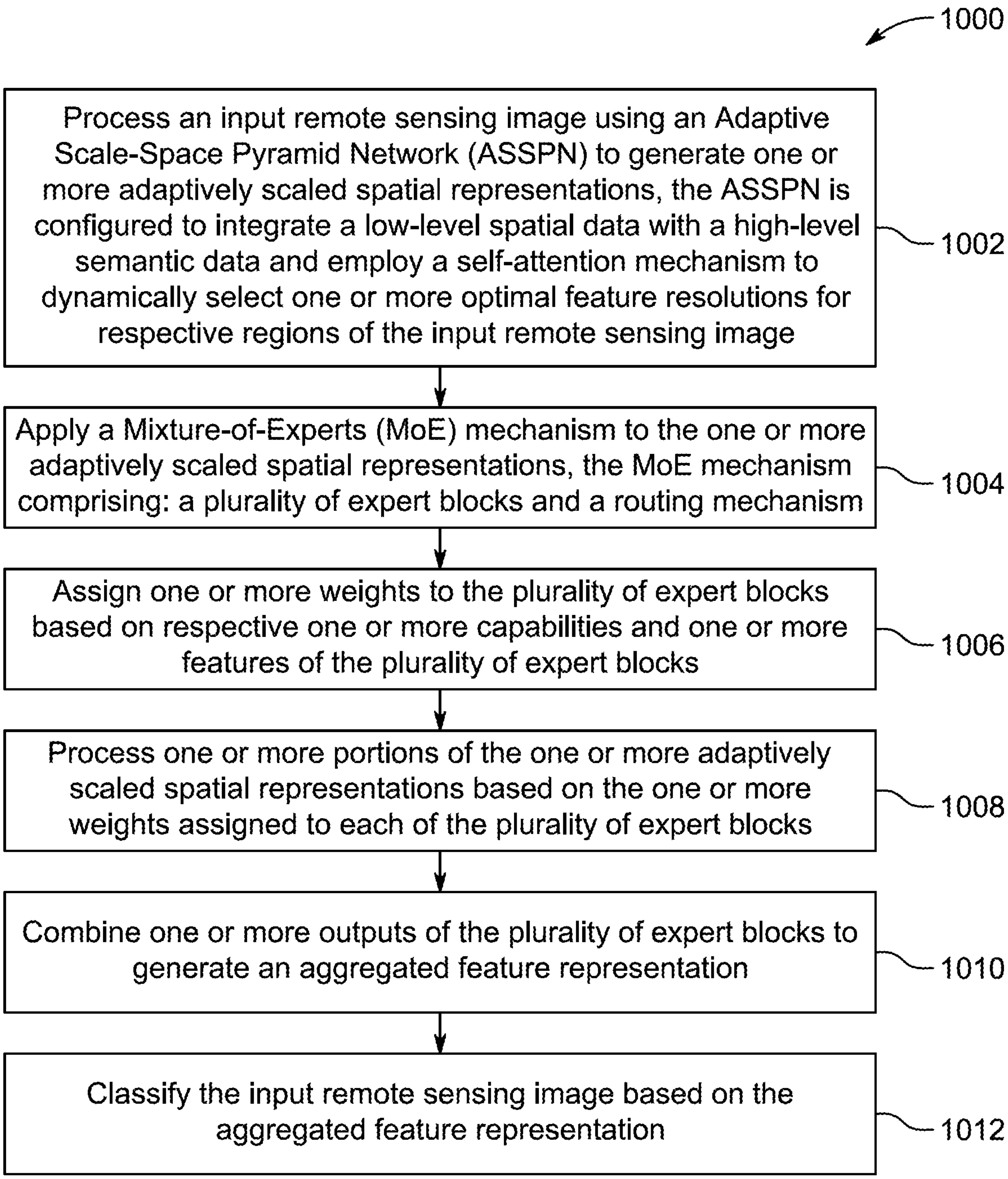
FIG. 11 is a flowchart depicting a method for remote sensing scene classification, according to an embodiment of the present invention.

FIG. 11 illustrates an embodiment of a method 1000 for remote sensing scene classification, in accordance with the present disclosure. The method 1000 may be executed by one or more processors and implemented using the system illustrated in FIG. 3.

At step 1002, an input remote sensing image (e.g., input image 202 shown in FIG. 3) is processed using an Adaptive Scale-Space Pyramid Network (ASSPN) to generate one or more adaptively scaled spatial representations.

In an embodiment, the ASSPN integrates low-level spatial data extracted from initial convolutional layers with high-level semantic data extracted from deeper network layers, including dense blocks 204, 210, and 214 shown in FIG. 3. The ASSPN employs a self-attention mechanism, including the channel attention module 218 and the spatial attention module 220 shown in FIG. 3, to dynamically select one or more optimal feature resolutions for respective regions of the input remote sensing image.

In one implementation, the one or more adaptively scaled spatial representations are generated based on feature entropy and contextual variance associated with extracted features.

At step 1004, a Mixture-of-Experts (MoE) architecture is applied to the one or more adaptively scaled spatial representations. As illustrated in FIG. 3, the MoE architecture comprises the plurality of expert blocks 222 and 224 and the routing mechanism 226.

The adaptively scaled spatial representations are provided as inputs to the plurality of expert blocks and the routing mechanism. In one embodiment, the routing mechanism 226 may assign weighting coefficients to the plurality of expert blocks based on feature relevance.

At step 1006, the routing mechanism 226 assigns one or more weights to the plurality of expert blocks 222, 224. The weights are assigned based on respective capabilities and features of the plurality of expert blocks, as determined from the input feature representations.

In an embodiment, the routing mechanism comprises a primary linear layer, the first ReLU activation layer, the secondary linear layer, and the SoftMax activation layer, which collectively generate normalized weighting coefficients corresponding to each expert block.

At step 1008, each expert block 222, 224 processes one or more portions of the adaptively scaled spatial representations in accordance with the assigned weights.

In an embodiment, each expert block comprises the plurality of linear layers, the dropout layer with the 0.5 dropout factor, and the rectified linear unit (ReLU) activation function, as illustrated in FIG. 3. Each expert block produces an expert-specific output feature representation. In an embodiment, the assigned weights modulate the contribution of each expert block to downstream processing. Further, the expert-specific output feature representations may capture complementary aspects of the input data.

At step 1010, outputs of the plurality of expert blocks 222, 224 are combined to generate an aggregated feature representation. The aggregated feature representation is then used to classify the input remote sensing image, producing a scene classification output (e.g., final output 228 shown in FIG. 3).

In an embodiment, the aggregated feature representation is provided to a classification layer followed by a SoftMax activation function to generate class probability values.

In an embodiment, the method further comprises applying a multi-level feature fusion mechanism across a plurality of encoder branches and a plurality of decoder branches of a neural network architecture. The multi-level feature fusion mechanism uses one or more learned weighting functions to combine feature representations across multiple network depths, as illustrated by the hierarchical structure of the dense blocks 204, 210, and 214.

In an embodiment, the method further comprises processing the extracted features through the first dense block 204, the second dense block 210, and the third dense block 214, as shown in FIGS. 2, 5, and 6. Each of the first dense block 204, the second dense block 210, and the third dense block 214 comprises a plurality of dense layers arranged in a densely connected configuration.

In an embodiment, the method further comprises applying the first transition layer 208A after the first dense block 204, as illustrated in FIGS. 2 and 4. The first transition layer 208A comprises a batch normalization layer, a convolutional layer configured to reduce one or more channels, and an average pooling layer configured to reduce spatial dimensions.

In an embodiment, the method 1000 further comprises applying a second transition layer 208B after the second dense block 210, as illustrated in FIG. 3. The second transition layer 208B reduces feature dimensionality prior to processing by the third dense block 214.

Next, further details of the hardware description of the computing environment of FIG. 2 according to exemplary embodiments are described with reference to FIG. 12.

The hardware elements in order to achieve the computing device may be realized by various circuitry elements, known to those skilled in the art. For example, CPU 1101 or CPU 1103 may be a Xenon or Core processor from Intel of America or an Opteron processor from AMD of America, or may be other processor types that would be recognized by one of ordinary skill in the art. Alternatively, the CPU 1101, 1103 may be implemented on an FPGA, ASIC, PLD or using discrete logic circuits, as one of ordinary skilled in the art would recognize. Further, CPU 1101, 1103 may be implemented as multiple processors cooperatively working in parallel to perform the instructions of the inventive processes described above.

Figure 12:
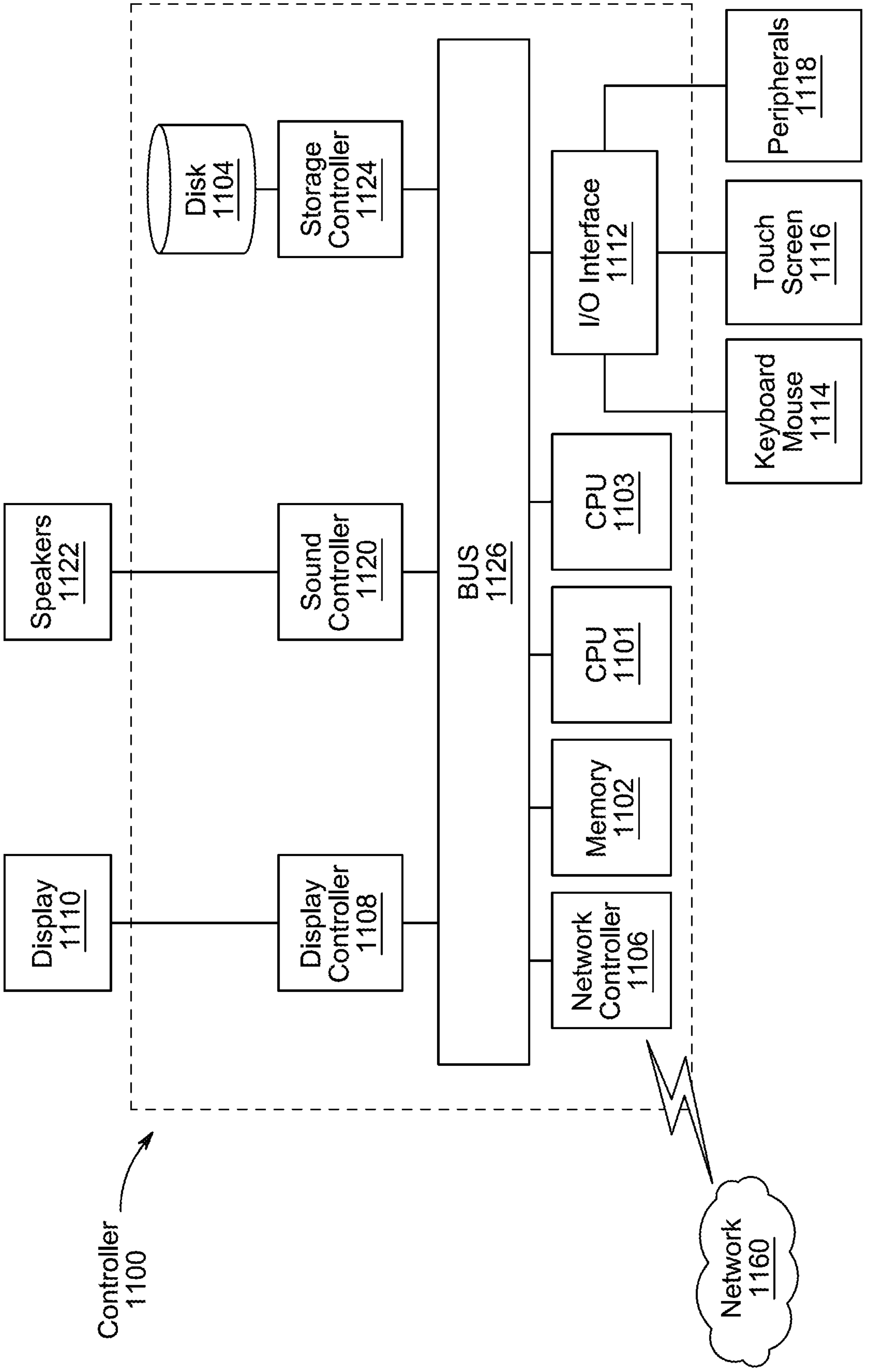
FIG. 12 is an illustration of a non-limiting example of details of computing hardware used in a computing system, according to certain embodiments.

The computing device in FIG. 12 also includes a network controller 1106, such as an Intel Ethernet PRO network interface card from Intel Corporation of America, for interfacing with network 1160. As can be appreciated, the network 1160 can be a public network, such as the Internet, or a private network such as an LAN or WAN network, or any combination thereof and can also include PSTN or ISDN sub-networks. The network 1160 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1108, such as a NVIDIA GeForce GTX or Quadro graphics adaptor from NVIDIA Corporation of America for interfacing with display 1110, such as a Hewlett Packard HPL2445w LCD monitor. A general purpose I/O interface 1112 interfaces with a keyboard and/or mouse 1114 as well as a touch screen panel 1916 on or separate from display 1110. General purpose I/O interface also connects to a variety of peripherals 1118 including printers and scanners, such as an OfficeJet or DeskJet from Hewlett Packard.

A sound controller 1120 is also provided in the computing device such as Sound Blaster X-Fi Titanium from Creative, to interface with speakers/microphone 1122 thereby providing sounds and/or music.

The general-purpose storage controller 1124 connects the storage medium disk 1104 with communication bus 1126, which may be an ISA, EISA, VESA, PCI, or similar, for interconnecting all of the components of the computing device. A description of the general features and functionality of the display 1110, keyboard and/or mouse 1114, as well as the display controller 1108, general-purpose storage controller 1124, network controller 1106, sound controller 1120, and general purpose I/O interface 1112 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 12.

Figure 13:
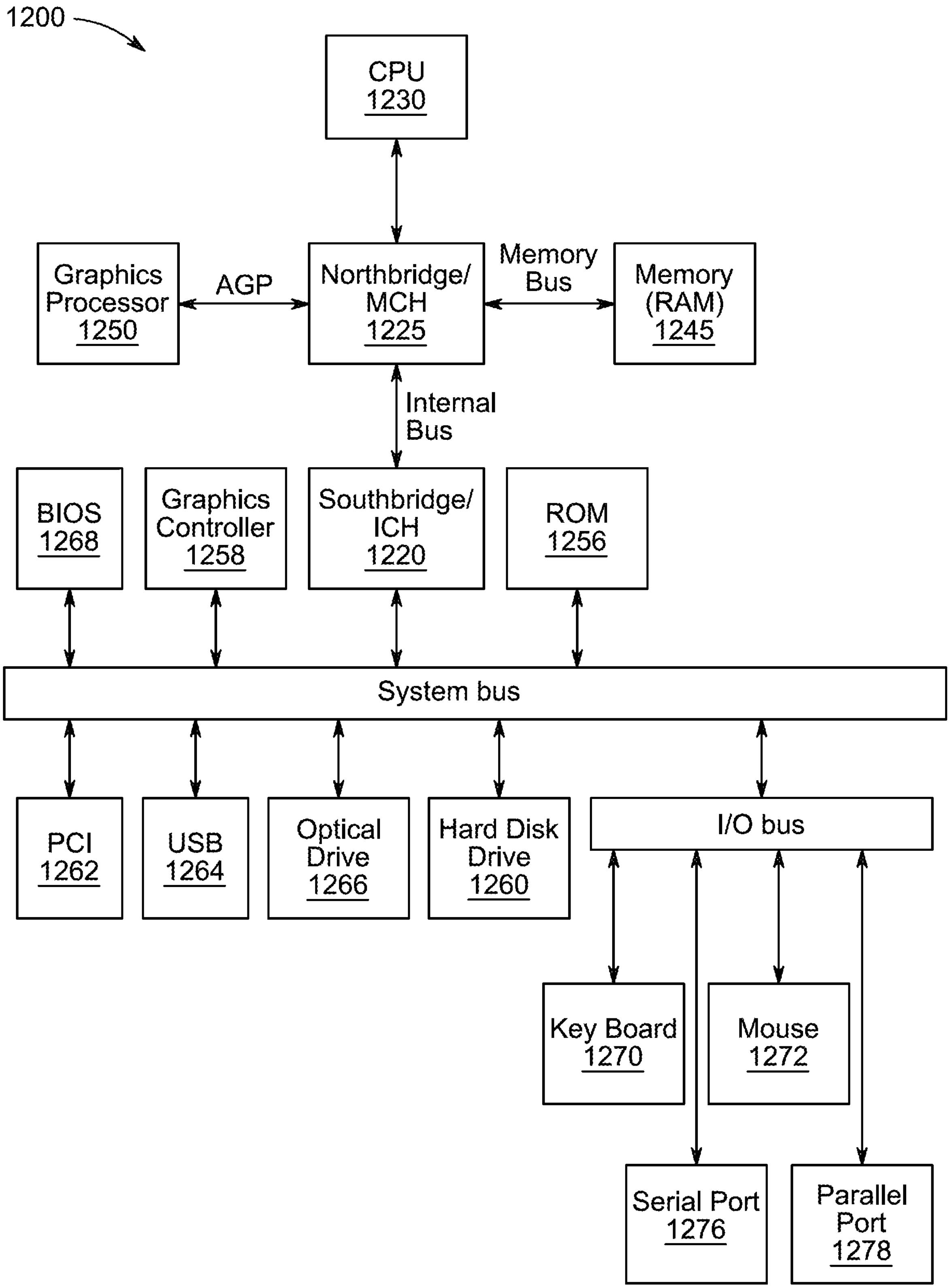
FIG. 13 is an exemplary schematic diagram of a data processing system used within the computing system, according to certain embodiments.

FIG. 13 shows a schematic diagram of a data processing system, according to certain embodiments, for performing the functions of the exemplary embodiments. The data processing system is an example of a computer in which code or instructions implementing the processes of the illustrative embodiments may be located.

In FIG. 13, data processing system 1200 employs a hub architecture including a north bridge and memory controller hub (NB/MCH) 1225 and a south bridge and input/output (I/O) controller hub (SB/ICH) 1220. The central processing unit (CPU) 1230 is connected to NB/MCH 1225. The NB/MCH 1225 also connects to the memory 1245 via a memory bus and connects to the graphics processor 1250 via an accelerated graphics port (AGP). The NB/MCH 1225 also connects to the SB/ICH 1220 via an internal bus (e.g., a unified media interface or a direct media interface). The central processing unit (CPU) 1230 may contain one or more processors and even may be implemented using one or more heterogeneous processor systems.

Figure 14:
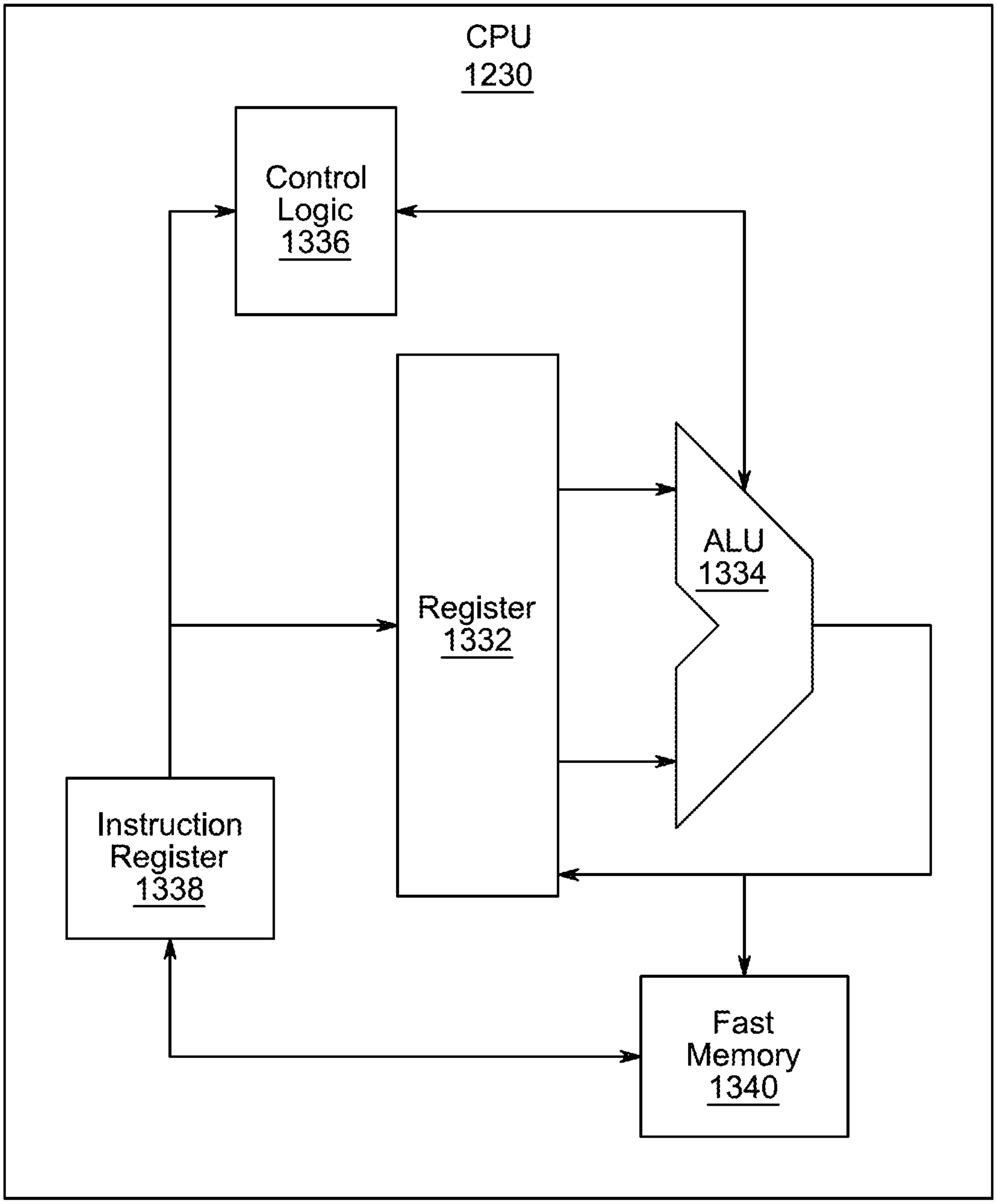
FIG. 14 is an exemplary schematic diagram of a processor used with the computing system, according to certain embodiments.

For example, FIG. 14 shows one implementation of CPU 1330. In one implementation, the instruction register 1338 retrieves instructions from the fast memory 1340. At least part of these instructions is fetched from the instruction register 1338 by the control logic 1336 and interpreted according to the instruction set architecture of the CPU 1230. Part of the instructions can also be directed to the instruction register 1338. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1334 that loads values from the instruction register 1338 and performs logical and mathematical operations on the loaded values according to the instructions. The results from these operations can be feedback into the register and/or stored in the fast memory 1340. According to certain implementations, the instruction set architecture of the CPU 1230 can use a reduced instruction set architecture, a complex instruction set architecture, a vector processor architecture, and a very large instruction word architecture. Furthermore, the CPU 1230 can be based on the Von Neuman model or the Harvard model. The CPU 1230 can be a digital signal processor, an FPGA, an ASIC, a PLA, a PLD, or a CPLD. Further, the CPU 1230 can be an x56 processor by Intel or by AMD, an ARM processor, a Power architecture processor by, e.g., IBM; a SPARC architecture processor by Sun Microsystems or by Oracle; or other known CPU architecture.

Referring again to FIG. 13, the data processing system 1200 can include that the SB/ICH 1220 is coupled through a system bus to an I/O Bus, a read only memory (ROM) 1256, universal serial bus (USB) port 1264, a flash binary input/output system (BIOS) 1268, and a graphics controller 1258. PCI/PCIe devices can also be coupled to SB/ICH 1220 through a PCI bus 1262.

The PCI devices may include, for example, Ethernet adapters, add-in cards, and PC cards for notebook computers. The Hard disk drive 1260 and CD-ROM666 can use, for example, an integrated drive electronics (IDE) or serial advanced technology attachment (SATA) interface. In one implementation the I/O bus can include a super I/O (SIO) device.

Further, the hard disk drive (HDD) 1260 and optical drive 1266 can also be coupled to the SB/ICH 1220 through a system bus. In one implementation, a keyboard 1270, a mouse 1272, a parallel port 1278, and a serial port 1276 can be connected to the system bus through the I/O bus. Other peripherals and devices that can be connected to the SB/ICH 1220 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 15:
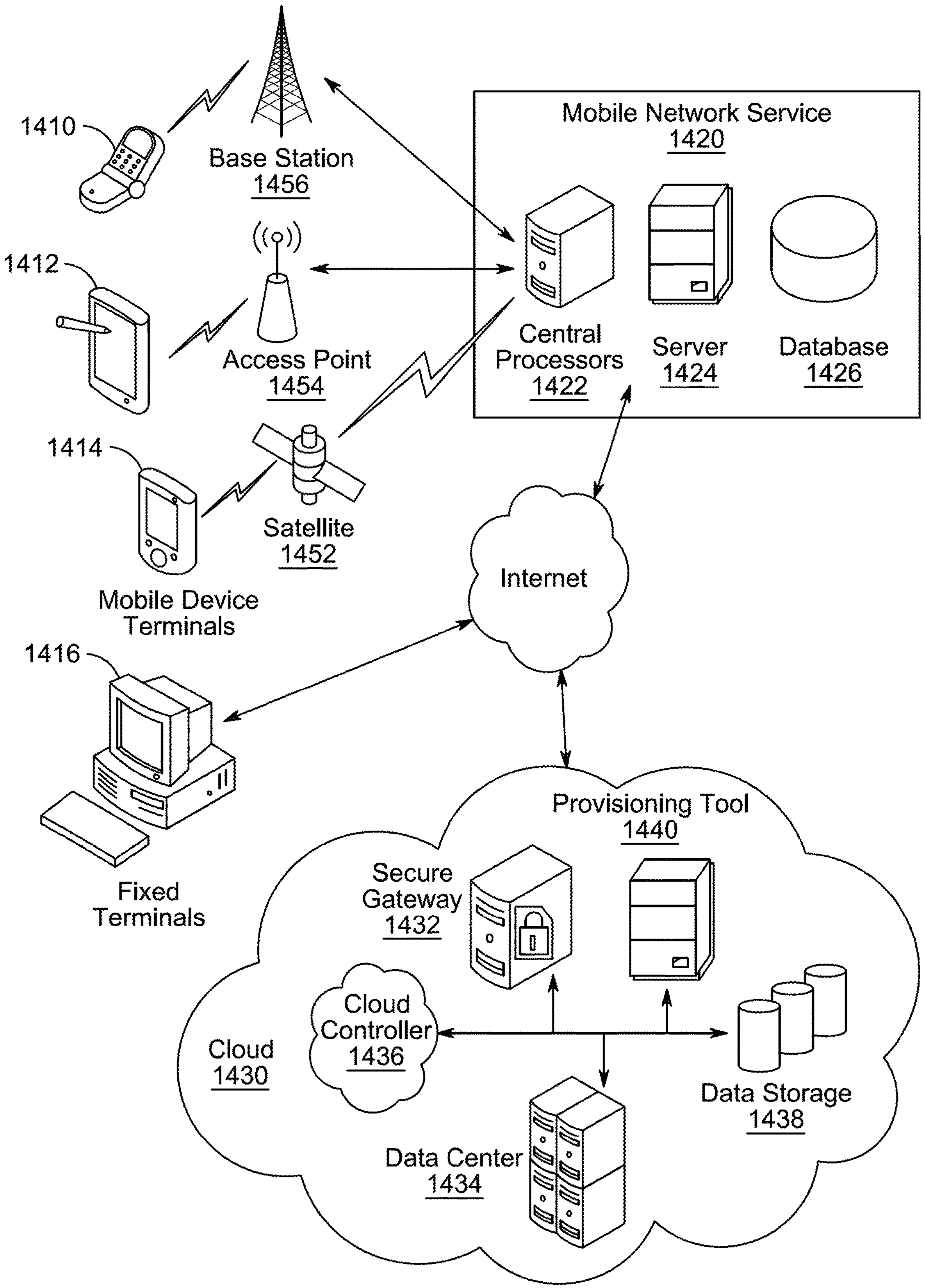
FIG. 15 is an illustration of a non-limiting example of distributed components which may share processing with a controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 15, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely, either in real-time or as a batch process. Additionally, some aspects of the present disclosures may be performed on modules or hardware not identical to those described. Accordingly, other aspects of the present disclosures are within the scope that may be claimed. More specifically, FIG. 15 illustrates client devices including smart phone 1411, tablet 1412, mobile device terminal 1414 and fixed terminals 1416. These client devices may be commutatively coupled with a mobile network service 1420 via base station 1456, access point 1454, satellite 1452 or via an internet connection. Mobile network service 1420 may comprise central processors 1422, server 1424 and database 1426. Fixed terminals 1416 and mobile network service 1420 may be commutatively coupled via an internet connection to functions in cloud 1430 that may comprise security gateway 1432, data center 1434, cloud controller 1436, data storage 1438 and provisioning tool 1440.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. An aerial image classification system, comprising:
- an unmanned aerial vehicle (UAV) comprising a camera, a memory and a local processor, and
- a central server unit comprising a central processor configured to:
  - process an input remote sensing image to generate one or more adaptively scaled spatial representations;
  - apply a Mixture-of-Experts (MoE) architecture to the one or more adaptively scaled spatial representations, wherein the MoE architecture comprises a plurality of expert blocks and a routing mechanism;
  - assign, by the routing mechanism, one or more weights to the plurality of expert blocks based on respective one or more capabilities and one or more features of the plurality of expert blocks;
  - process, by each expert block, one or more portions of the one or more adaptively scaled spatial representations based on the one or more weights assigned to each of the plurality of expert blocks;
  - combine one or more outputs of the plurality of expert blocks to generate an aggregated feature representation; and
  - classify the input remote sensing image based on the aggregated feature representation.

2. The system of claim 1, wherein the processor is configured to process the input remote sensing image by using an Adaptive Scale-Space Pyramid Network (ASSPN) to generate the one or more adaptively scaled spatial representations, wherein the ASSPN is configured to integrate a low-level spatial data with a high-level semantic data and employ a self-attention mechanism to dynamically select one or more optimal feature resolution for respective regions of the input remote sensing image.

3. The system of claim 1, wherein the one or more adaptively scaled spatial representations is generated based on feature entropy and contextual variance.

4. The system of claim 1, wherein each of the plurality of expert blocks comprising: a plurality of linear layers, a dropout layer with a 0.5 dropout factor, and a rectified linear unit (ReLU) activation function.

5. The system of claim 1, wherein the routing mechanism comprises a primary linear layer, a first ReLU activation layer, a secondary linear layer, and a SoftMax activation layer.

6. The system of claim 1, wherein the processor is configured to process the one or more features through a first dense block, a second dense block, and a third dense block.

7. The system of claim 6, wherein the processor is configured to apply a first transition layer block after the first dense block, wherein the first transition layer block comprises:
- a batch normalization layer,
- a convolutional layer configured to reduce one or more channels, and
- an average pooling layer configured to reduce spatial dimensions.

8. The system of claim 6, wherein the first dense block, the second dense block, and the third dense block comprises a plurality of dense layers.

9. The system of claim 6, wherein the processor is configured to apply a second transition layer block after the second dense block.

* * * * *